Nov. 24, 1953  R. H. WRIGHT ET AL  2,660,238
COMBINATION VENETIAN BLIND TAPE FASTENER, CORD
ANCHOR, PULLEY SUPPORT, AND COVER THEREFOR
Filed Sept. 18, 1950  2 Sheets-Sheet 1

INVENTOR.
R. H. Wright & Anthony Zay
BY Robb & Robb
Attorneys.

INVENTOR.
R. H. Wright + Anthony Zay
BY Robbs Roba
Attorneys.

Patented Nov. 24, 1953

2,660,238

UNITED STATES PATENT OFFICE 2,660,238

COMBINATION VENETIAN BLIND TAPE FASTENER, CORD ANCHOR, PULLEY SUPPORT, AND COVER THEREFOR

Richard H. Wright, Bratenahl, and Anthony Zay, Cleveland, Ohio, assignors to Guarantee Specialty Manufacturing Company, Cleveland, Ohio, a corporation Application September 18, 1950, Serial No. 185,439

1 Claim. (Cl. 160—173)

This invention relates to Venetian blinds and more particularly to novel parts of such structure adapted to be used therein, whereby slat supporting tapes may be readily connected to and disconnected from the tilt and bottom rails or bars thereof, and in addition, novel means are provided for anchoring the lift cord, together with pulley means over which the lift cords are to be reeved, and further a cover member is provided for such cord anchor and pulley supporting members whereby the tapes may be maintained in fixed relation with the same.

It is an object of this invention to provide simple means for connecting Venetian blind tapes to the tilt rails and bottom rails employed in Venetian blinds, the said tape connecting means including means for anchoring cords thereto and likewise for supporting pulleys or the like therein.

It is a further object of this invention to provide a novel clamping device whereby the tapes availed of in Venetian blind construction may be maintained in their position on the tape fasteners or connectors.

It is a further object of this invention to provide a combination tape fastener, cord anchor, and pulley support, which may be readily formed, as by metal stamping or the like, the same being suitable for emplacement and removal from tilt bars or rails and bottom bars or rails, as the case may be.

It is a further object of this invention to provide a cord anchor device which includes means for fastening tapes thereto, which cord anchoring device may also be equipped with a pulley, over which lift cords may be reeved or trained.

It is a further object of this invention to provide the novel tape fastener, cord anchor, and pulley support device with a removable cover member, adapted to frictionally engage a tilt bar or tilt rail and a bottom rail, whereby the same may be removed, preliminary to removal of tapes from connections therewith, and subsequently, re-emplaced in engagement with such rails or bars, the said cover member enhancing the appearance of the blind and at the same time performing a useful function with regard to connection of tape to the various parts thereof, as required by such construction.

It is a further object of this invention to provide the novel devices above referred to, which are particularly suitable for use with Venetian blinds which employ metal tilt rails and bottom bars of conventional construction, or in the alternative, the same devices may be used with other types of rails or bars presently in use, or which may be used in the future.

Other and further objects of this invention will be readily apparent and clearly understood from consideration of the description of the various component parts taken in conjunction with the drawings, in which.

Figure 1:
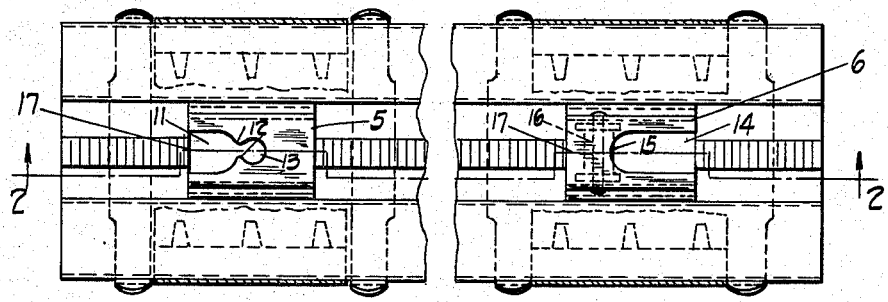
Figure 1 is a top plan view showing the tape fastener, cord anchor, and cover therefor, in place on a rail or bar of a Venetian blind, the same view disclosing a cord anchor device when used in conjunction with a pulley similarly arranged, together with a cover on a tilt bar or bottom rail.
Figure 7:
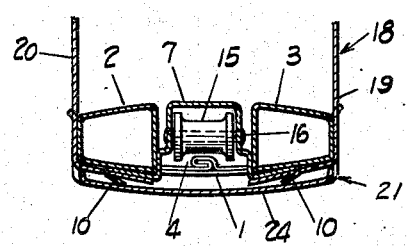
Figure 7 is a transverse sectional view taken about on the line 7—7 of Figure 3, showing the pulley support in place in one form of bottom rail or tilt rail, together with the tapes in engagement with the tape fastener, and the cover plate in place to maintain the tapes in their connected relationship with the said fastener.

Referring to Figures 1 and 7 in the drawings, the cord anchor, pulley support, and tape fastening devices are shown emplaced in a tilt rail or bottom rail, as the case may be.

Figure 7 discloses the particular form of bottom rail with which the devices are primarily adapted to be used, said bottom rail including a concave body portion 1 of suitable width, provided at its longitudinal edges with hollow flange portions 2 and 3. It will be apparent that this construction provides a longitudinally extending channel between the said side flange members 2 and 3 for purposes which will be hereinafter set forth. This channel will be designated 4 and is adapted to receive therein the cord anchor and pulley supporting members designated 5 and 6 respectively, and to be further described subsequently.

Figure 2:
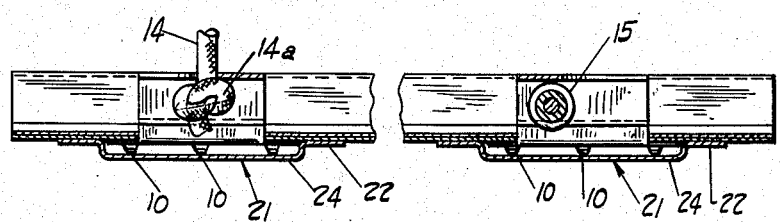
Figure 2 is a transverse sectional view taken about on the line 2—2 of Figure 1.
Figure 5:
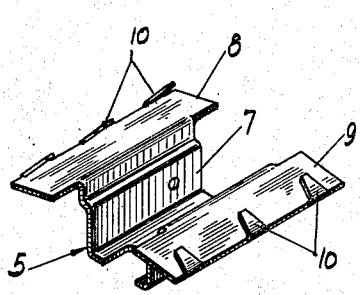
Figure 5 is a view in perspective of the cord anchor and tape fastener device, looking at the bottom thereof.

The drawing of Figure 5, taken in conjunction with the showing in Figure 7, illustrates the preferred general outline and shape of the combined tape fastener, and cord anchor, and pulley support, the showing in Figure 5 being that of the cord anchor. It will be noted from a consideration of this figure that the cord anchor 5 comprises a substantially U-shaped body portion 7 having offstanding flanges 8 and 9 formed integrally therewith, the said flanges 8 and 9 in turn being provided with tooth-like tape penetrating members 10 at the outer edges of the flanges 8 and 9. These members 10 extend from the edges of the respective flanges inwardly toward the juncture of the flanges with the U-shaped channel or body member 7, and at an angular relation to the surfaces of the flanges. The bottom portion of the U-shaped body member 7 is provided with slot 11 (see Figure 1), the said slot 11 being reduced at its inner end by the locking abutments 12, the said abutments 12 providing a decreased passageway which opens into cord receiving opening 13. It will be apparent from the foregoing that a cord such as shown in Figure 2 designated 14, may be knotted at its end as at 14a, whereby the body of the cord 14 may be caused to enter the cord receiving opening 13 of Figure 1, and subsequently be retained therein by means of the knot 14a on the said cord. Referring again to Figure 1, it will be noted that the pulley support member 6 is substantially identical with the cord anchor 5 as to the U-shaped body portion 7 and the flanges 8 and 9, together with the tooth-like tape penetrating members 10 formed with the said flanges 8 and 9, but in this supporting member the slot 14 there is not provided with any reduced section. In this form of the member a suitable pulley 15 is provided, supported in opposite sides of the U-shaped body 7 by means of a rivet 16 or the like. In this conjunction also see the disclosure of Figure 7, which more particularly illustrates the manner of mounting of the pulley 15 in the support 6 therefor.

Referring to Figure 1, it will be noted that the rail disclosed therein is provided with substantially rectangular openings 17 adapted to receive therein the U-shaped body member 7 of the cord anchor and pulley supports 5 and 6 respectively. When the members 5 and 6 have been inserted in the openings 17 therefor, provided in the rail, the same will be in substantially the position shown in Figures 2 and 7. It will be clear that in the usual Venetian blind wherein only two tape units are availed of, the normal provision would be that two of the members 5 will be positioned in the bottom rail and have the cord 14 with the knot 14a in place therein. The head rail of the device will be provided with two pulleys such as are shown in Figure 7, suitably emplaced in a channel therein, whereby the lift cords may be reeved thereover and thence to one end or the other of the head rail, whereby suitable operation thereof will effect raising and lowering of the slats and bottom rail of the blind, in accordance with usual Venetian blind construction.

Figure 3:
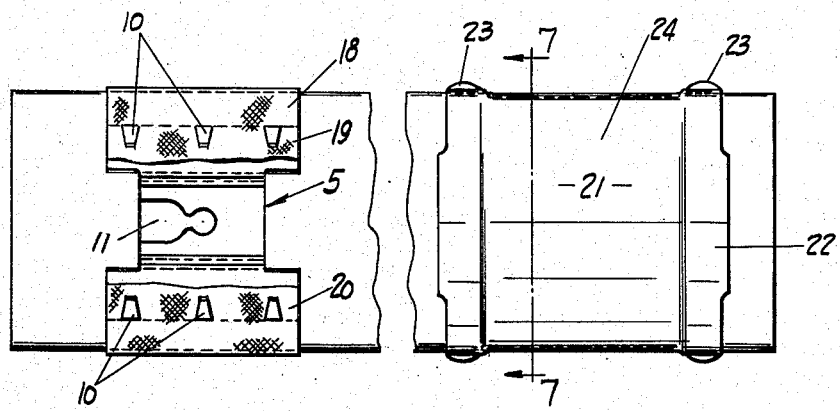
Figure 3 is a bottom plan view showing the cord anchoring device in place in a bottom rail or the like with the tape connected thereto whereby the said bottom rail is supported in the Venetian blind. This same view discloses the cover plate as being emplaced over the tape fastener.

In order to provide the necessary fastening of the tapes, which are used commonly with Venetian blinds, the units comprising the cord anchor 5 and pulley supporting member 6, are for example, placed in the bottom rail, as shown in Figure 3, and the tape at its ends at respective sides of the said rail is forced over the tooth-like tape penetrating members 10 so as to maintain the ends of the tape in connected relation with the said bottom rail. If the top rail or tilt rail is of similar structure to that just referred to it will be apparent that either one or the other of the units 5 or 6 may be used to secure the said tape to the tilt rail. In this particular arrangement it will be immaterial which one is used inasmuch as the cord is not desirably anchored thereto nor is it reeved over a pulley such as 15, but normally passes upwardly into the head rail of the blind and thence over pulleys provided therein to one side or the other of said head rail, into a position where the same may be grasped by an operator of the blind for raising and lowering control of the slats thereof.

Figure 6:
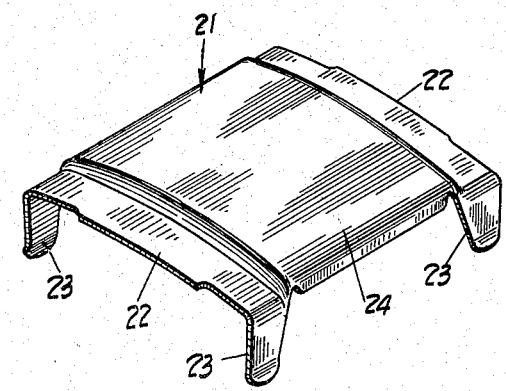
Figure 6 is a perspective view of the cover plate or cover illustrating the formation thereof for the purposes of this invention.

Referring again to Figure 3, wherein the tape generally designated 18 is fastened at its ends 19 and 20 to opposite tooth-like penetrating members 10 on the cord anchor 5, it should be noted that the possibility of the ends of the tape becoming disengaged with the said members 10 exists. Therefore, we provide a cover generally designated 21, such as is illustrated in Figure 6, and which comprises a substantially rectangular member including transverse portions 22, at opposite ends thereof, the said transverse portions being provided with downwardly depending frictional engaging members 23 adapted to coact with the sides of the bottom rail or tilt rail, as the case may be, to maintain the cover member 21 in place thereon. The main body portion 24 of the cover member 21 is raised slightly with respect to the planes of the surfaces of the transversely extending members 22 so as to provide an opening between the inner surface thereof and the surface of the rail to which the same may be affixed, whereby the unit, such as a cord anchor 5, may be completely covered by the said cover member 21. The cover member 21 is shown as being in place in Figure 3 so as to cover up the tooth-like tape penetrating members 10 as well as the cord anchor member 5 as a whole. The cover member 21 provides an additional function, in that it prevents the unauthorized or accidental displacement of the ends 19 and 20 of the tape 18, when the same has been adjusted in its engagement with the tape penetrating members 10. This is very clearly shown in Figure 7, wherein the main body member 24 of the cover member 21 is shown as having its inner surface in contact with the ends of the tape penetrating members 10, and the members 23 in frictional engagement with opposite sides of a bottom rail, in this instance. The cover member additionally provides means for maintaining the cord anchor 5 or pulley support 6 in its position in the bottom rail or other rail, as is contemplated by this construction by reason of its contact with the penerating members 10. This cover plate will therefore be seen to serve several necessary and desirable functions in cooperation with the cord anchor and pulley supporting members.

Figure 4:
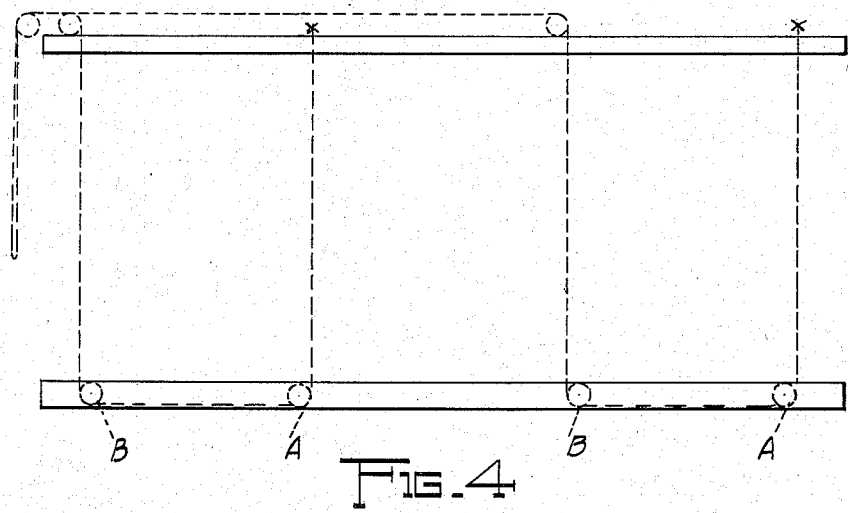
Figure 4 is a diagrammatic view showing one method of reeving lift cords in a Venetian blind, whereby to produce what is known as a compound lifting effect.

Referring now to Figure 4, wherein is disclosed a diagrammatic illustration of the reeving of cords in a compound blind, it will be at once apparent that the various members which comprise our invention, viz., the tape fastener, cord anchor, pulley support, and cover therefor, are adapted to very readily be incorporated in such a blind so as to carry out the compound lifting function which is necessarily present in a blind which is fitted in a wide window, and which, therefore, of necessity avails of a plurality of tapes, more than two, the same being of necessity fastened to the tilt rail and to the bottom rail in such a construction. In order to more particularly point out the desirable features of our invention in connection with Figure 4, it should be noted that a member formed with a pulley, viz., a member 6, may be appropriately positioned in position A in said figure whereby the cord may be reeved thereover, and the tape which is commonly used in such a position fixed thereto. It will be apparent that at position B a pulley support or supporting member 6 may be desirably used whereby the cord may be reeved over the same and then upwardly again into the head bar of the blind. In view of the foregoing, a multiplicity of units of the type being referred to may be used at such positions throughout the width of a blind to effect the compound lifting thereof which is desirable in a heavy and wide blind.

While no tilt rail is shown in this construction, it will be clear that the members 5 or 6, as the case may be, may be availed of for use with the tilt rail to secure the tapes thereto which are located at positions A and B in such view. It will, of course, be understood that the cover members 21 will be used at each of the positions A and B and in corresponding positions in the tilt rail if either of the members 5 or 6 is used therewith.

The foregoing description of the devices which comprise our invention, will make readily apparent their particular usefulness and also that the same may be easily formed of metal or the like, preferably, although not necessarily limited to such construction. It will also be understood that our devices are designed for use with metal tilt rails and bottom rails whereby tapes and cords may be readily attached and detached therefrom without the necessity for providing special loops in the tape or tapes which are at present required with certain tape connecting constructions. In addition, the various devices may obviously be used with wooden rails, whereby the same desirable characteristics previously referred to are likewise present.

Having thus described our invention, what we claim as new and desire to secure by Letters Patent of the United States is:

In Venetian blind construction, in combination, a rail comprising a concave body portion having spaced hollow flange portions providing a longitudinal channel between the said flange portions, the rail being cut away at the channel portion to provide an opening therethrough, a unitary cord and tape connecting member comprising a U-shaped body detachably inserted through said opening to occupy a position in said channel and being formed of a depth approximately that of the channel, the sides of the connecting member being each formed with a laterally projecting flange and said flanges extending in opposite directions and overlapping in contacting relation the adjacent faces of the hollow channel portions of the rail, each flange being formed at its outer edge with penetrating projections bent inwardly from the edges and away from the rail body, tapes having ends thereof passed over the channel portions of the rail transverse thereto but directly engaging the flanges of the connecting member that contact said channel portions, said tape ends having the said penetrating projections passing therethrough, and a cover member consisting of a substantially rectangular body formed with offstanding end projections at its side edges in frictional detachable engagement with corresponding edges of the rail, the main area of the cover member between spaced pairs of the end projections being raised slightly to form a space in which the tape passes between the cover and the adjacent portions of said flanges, said cover extending over the flanges of the connecting member and in substantial contact with the penetrating members extending therefrom and wholly housing the flanges, their projections and the adjacent tape ends penetrated by the last named projections.

RICHARD H. WRIGHT.
ANTHONY ZAY.

References Cited in the file of this patent

UNITED STATES PATENTS

| Number | Name | Date |
|---|---|---|
| 2,079,852 | Grassby | May 11, 1937 |
| 2,114,057 | Lorentzen | Apr. 12, 1938 |
| 2,421,505 | Hunter | June 3, 1947 |
| 2,491,181 | Hunter | Dec. 13, 1949 |
| 2,508,742 | Bell | May 23, 1950 |
| 2,520,109 | Rosenbaum | Aug. 22, 1950 |
| 2,527,104 | Schaefer | Oct. 24, 1950 |
| 2,546,534 | Znidarsic | Mar. 27, 1951 |
| 2,561,141 | Schaefer | July 17, 1951 |
| 2,569,173 | Junkunc | Sept. 25, 1951 |
| 2,579,137 | Bruner | Dec. 18, 1951 |
| 2,616,496 | Junkunc | Nov. 4, 1952 |
| 2,618,329 | Nelson | Nov. 18, 1952 |
| 2,623,581 | Nelson | Dec. 30, 1952 |

FOREIGN PATENTS

| Number | Country | Date |
|---|---|---|
| 14,109 | Great Britain | 1898 |
| 1,704 | Great Britain | 1899 |